US012656495B2

(12) United States Patent
Asghari et al.

(10) Patent No.: US 12,656,495 B2
(45) Date of Patent: Jun. 16, 2026

(54) IMAGING SYSTEM HAVING REDUCED ADC SAMPLING RATES

(71) Applicant: SiLC Technologies, Inc., Monrovia, CA (US)

(72) Inventors: Mehdi Asghari, La Canada Flintridge, CA (US); Nirmal Chindhu Warke, Saratoga, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 1135 days.

(21) Appl. No.: 17/691,115

(22) Filed: Mar. 9, 2022

(65) Prior Publication Data

US 2023/0288567 A1     Sep. 14, 2023

(51) Int. Cl.
G01S 17/89 (2020.01)
G01S 17/58 (2006.01)

(52) U.S. Cl.
CPC .............. G01S 17/89 (2013.01); G01S 17/58 (2013.01)

(58) Field of Classification Search
CPC ........................... G01S 7/4808; G01S 7/48–51
See application file for complete search history.

(56) References Cited

U.S. PATENT DOCUMENTS

| | | | |
|---|---|---|---|
| 2010/0046802 A1* | 2/2010 | Watanabe | G01S 17/894 |
| | | | 348/46 |
| 2020/0064483 A1* | 2/2020 | Li | G01S 13/867 |
| 2020/0158830 A1* | 5/2020 | Asghari | G01S 7/484 |
| 2020/0226769 A1* | 7/2020 | Das | G06T 7/254 |
| 2021/0231805 A1* | 7/2021 | Dehlinger | G01S 7/4863 |
| 2022/0066017 A1* | 3/2022 | Gipson | G01S 15/8925 |

* cited by examiner

*Primary Examiner* — Yuqing Xiao
*Assistant Examiner* — Chia-Ling Chen
(74) *Attorney, Agent, or Firm* — Gavrilovich, Dodd & Lindsey LLP

(57) ABSTRACT

An imaging system has multiple cores that each outputs a system output signal that illuminates multiple sample regions in a field of view for the system. A first portion of the cores are each a range and velocity core and a second portion of the cores are each a velocity core. The system includes electronics that calculate a radial velocity and range for the sample regions illuminated by the range and velocity cores from the beat frequency of a composite signal generated by the range and velocity cores. The electronics also calculate a radial velocity range for the sample regions illuminated by the velocity cores from a beat frequency of a composite signal generated by the velocity cores. The electronics use the ranges calculated for the sample regions illuminated by the range and velocity cores to estimate the ranges for the velocity cores.

12 Claims, 12 Drawing Sheets

223 225

224

228

282

238

ADC

264

Real Transform

268 w

338

338

338 h

T

334

330

332

IMAGING SYSTEM HAVING REDUCED ADC SAMPLING RATES

FIELD

The invention relates to imaging systems. In particular, the invention relates to reducing the number of measurements in imaging systems.

BACKGROUND

There is an increasing commercial demand for 3D imaging systems that can be economically deployed in applications such as ADAS (Advanced Driver Assistance Systems) and AR (Augmented Reality). Imaging systems such as LIDAR (Light Detection and Ranging) are used to construct a 3D image of a target scene by illuminating the scene with laser light and measuring the returned signal.

Many LIDAR approaches transmit a system output signal. The system output signal is reflected by an object and a portion of the reflected light signal returns to the LIDAR chip as a LIDAR input signal. The LIDAR input signal is processed by electronics so as to determine the distance and radial velocity between the LIDAR system and the object. Because the LIDAR input signal is generally an analog signal but the processing is performed on digital signals, the LIDAR system often includes one or more an Analog-to-Digital Converters (ADC) for converting a light signal that includes light from the LIDAR input signal to a digital signal. The sample rates required by these Analog-to-Digital Converters (ADC) are so high that the Analog-to-Digital Converters (ADC) become a significant expense in the commercialization of LIDAR systems. Additionally, these LIDAR systems often must operate at bandwidths that require more expensive components.

For the above, reasons there is a need for a LIDAR system having reduced costs and complexity.

SUMMARY

An imaging system has multiple cores that each outputs a system output signal that illuminates multiple sample regions in the system's field of view. A first portion of the cores are each a range and velocity core and a second portion of the cores are each a velocity core. The system includes electronics that calculate a radial velocity and range for the sample regions illuminated by the range and velocity cores. The radial velocities and ranges are both calculated from the beat frequency of a composite signal generated by the range and velocity cores. The electronics also calculate a radial velocity for the sample regions illuminated by the velocity cores. The radial velocity is calculated from a beat frequency of a composite signal generated by the velocity cores. The electronics use the ranges calculated for the sample regions illuminated by the range and velocity cores to estimate the ranges for the sample regions illuminated by velocity cores.

An imaging system has multiple cores that each outputs a system output signal that illuminates multiple sample regions in a system's field of view. Each of the cores is configured to generate a composite signal beating at a beat frequency. A first portion of the cores are each a range and velocity core and a second portion of the cores are each a velocity core. The system includes electronics configured to calculate a radial velocity for the sample regions illuminated by each of the velocity cores. The electronics are also configured to calculate a range and a radial velocity for the sample regions illuminated by each of the range and velocity cores. The ranges indicate a distance between the system and an object located in the sample region for which the range is calculated. The electronics calculate the range for a sample region illuminated by a range and velocity core from the beat frequency of the composite signal generated by the range and velocity core. The radial velocity indicates the radial velocity between the system and an object located in the sample region for which the range is calculated. The electronics calculate the radial velocity for a sample region illuminated by a velocity core from the beat frequency of the composite signal generated by the velocity core. The electronics also calculate the radial velocity for a sample region illuminated by a range and velocity core from the beat frequency of the composite signal generated by the range and velocity core. The electronics are further configured to estimate ranges for sample regions illuminated by the velocity cores from the ranges calculated for sample regions illuminated by the range and velocity cores. A method of operating the imaging system is also disclosed.

DESCRIPTION

An imaging system has multiple cores that each outputs a system output signal that illuminates multiple sample regions in the system's field of view. A first portion of the cores are each a range and velocity core and a second portion of the cores are each a velocity core. The system includes electronics that calculate a radial velocity and range for the sample regions illuminated by the range and velocity cores (range and velocity regions) from the beat frequency of a composite signal generated by the range and velocity cores. The electronics also calculate a radial velocity for the sample regions illuminated by the velocity cores (velocity regions) from a beat frequency of a composite signal generated by the velocity cores. The ranges for the velocity regions are not generated from the beat frequency of the composite signal generated by the velocity cores. Instead, the electronics estimate the ranges for the velocity cores from the ranges calculated for the range and velocity sample regions.

The Analog-to-Digital Converters (ADC) needed to calculate range from a beat frequency require much higher sampling rates than the Analog-to-Digital Converters (ADC) needed to calculate radial velocity without calculating range. As a result, the Analog-to-Digital Converters (ADC) on the velocity cores can have lower sampling rates than the Analog-to-Digital Converters (ADC) on the range and velocity cores. This reduction in sample rates reduces the cost of the imaging system.

In addition to the reduced ADC sampling rates or as an alternative to the reduced ADC sampling rates, velocity cores can operate at lower bandwidths than the range and velocity cores. The reduced operation frequencies associated with the lower bandwidths reduces the cost and complexity of the velocity cores relative to the range and velocity cores and further reduces the cost and complexity of the imaging system.

Figure 1A:
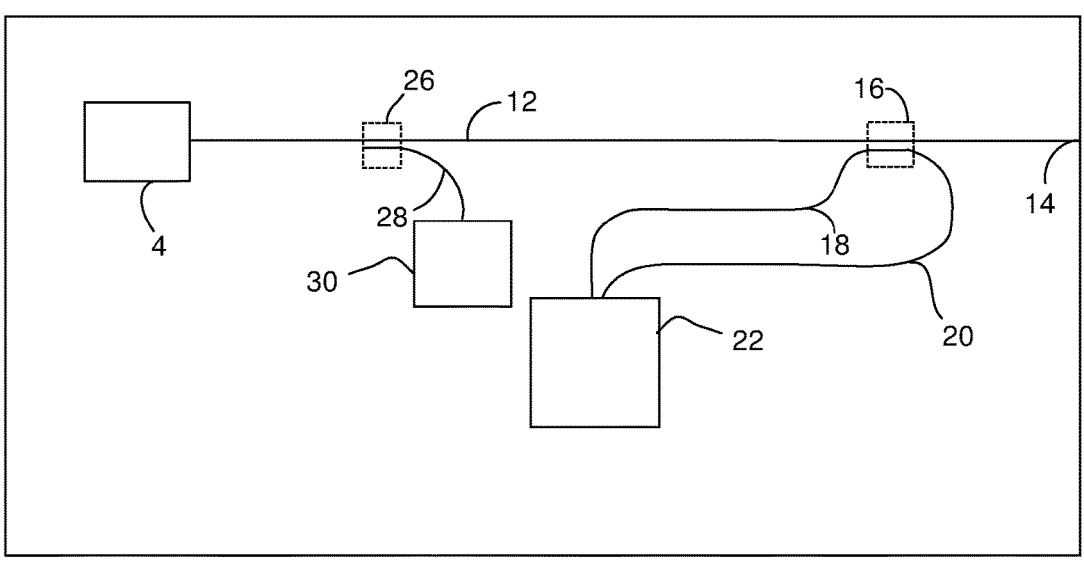
FIG. 1A is a topview of a schematic of a LIDAR system that includes or consists of a LIDAR chip that outputs a LIDAR output signal and receives a LIDAR input signal on a common waveguide.

FIG. 1A is a topview of a schematic of a LIDAR chip that can serve as a LIDAR core or can be included in an imaging system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the environment and/or atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR core, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a processing component 22 for further processing. Although FIG. 1A illustrates a directional coupler operating as the splitter 16, other signal tapping components can be used as the splitter 16. Suitable splitters 16 include, but are not limited to, directional couplers, optical couplers, y-junctions, tapered couplers, and Multi-Mode Interference (MIMI) devices.

The utility waveguide 12 also carrier the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the processing component 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMI) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MIMI) and the outgoing percentage and the incoming percentage are 50% or substantially 50%. As will be described in more detail below, the processing component 22 combines the comparative signal with the reference signal to form a composite signal that carries LIDAR data for a sample region on the field of view. Accordingly, the composite signal can be processed so as to extract LIDAR data (radial velocity and/or distance between a LIDAR core and an object external to the LIDAR core) for the sample region.

The LIDAR chip can include a control branch for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MIMI) devices.

The control waveguide 28 carries the tapped signal to control components 30. The control components can be in electrical communication with electronics 32. All or a portion of the control components can be included in the electronics 32. During operation, the electronics can employ output from the control components 30 in a control loop configured to control a process variable of one, two, or three loop controlled light signals selected from the group consisting of the tapped signal, the system output signal, and the outgoing LIDAR signal. Examples of the suitable process variables include the frequency of the loop controlled light signal and/or the phase of the loop controlled light signal.

Figure 1B:
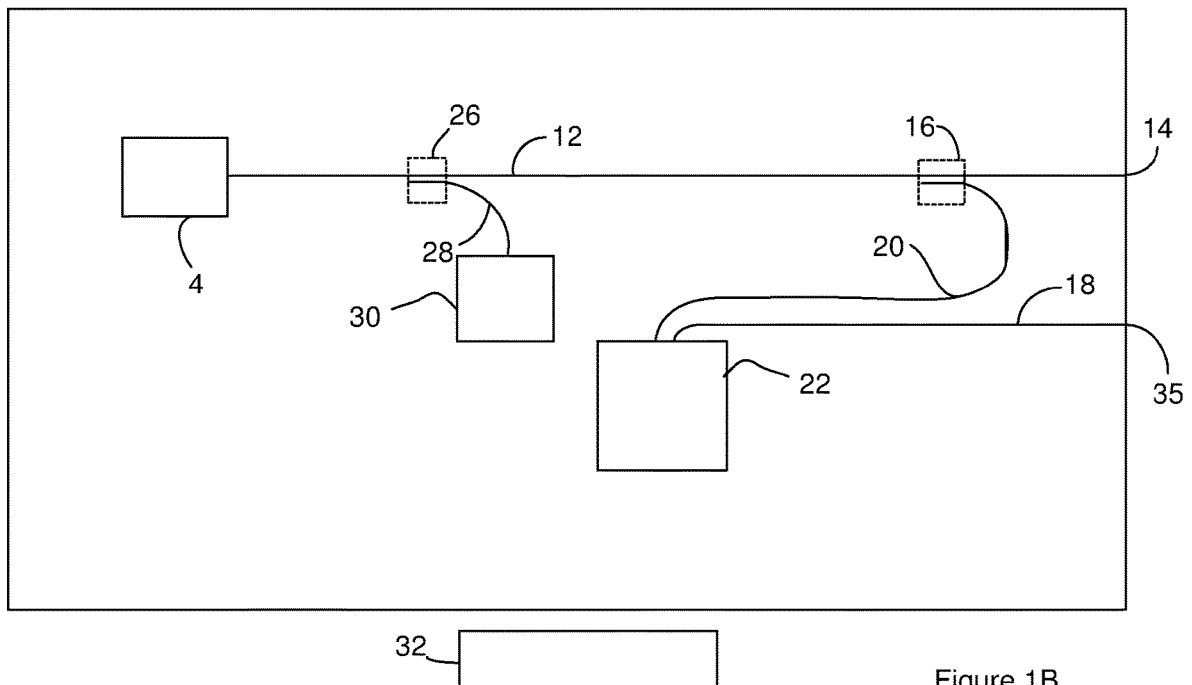
FIG. 1B is a topview of a schematic of a LIDAR system that includes or consists of a LIDAR chip that outputs a LIDAR output signal and receives a LIDAR input signal on different waveguides.

The LIDAR core can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR core, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a processing component 22 for further processing. As described in the context of FIG. 1A, the reference waveguide 20 carries the reference signal to the processing component 22 for further processing. As will be described in more detail below, the processing component 22 combines the comparative signal with the reference signal to form a composite signal that carries LIDAR data for a sample region on the field of view.

Figure 1C:
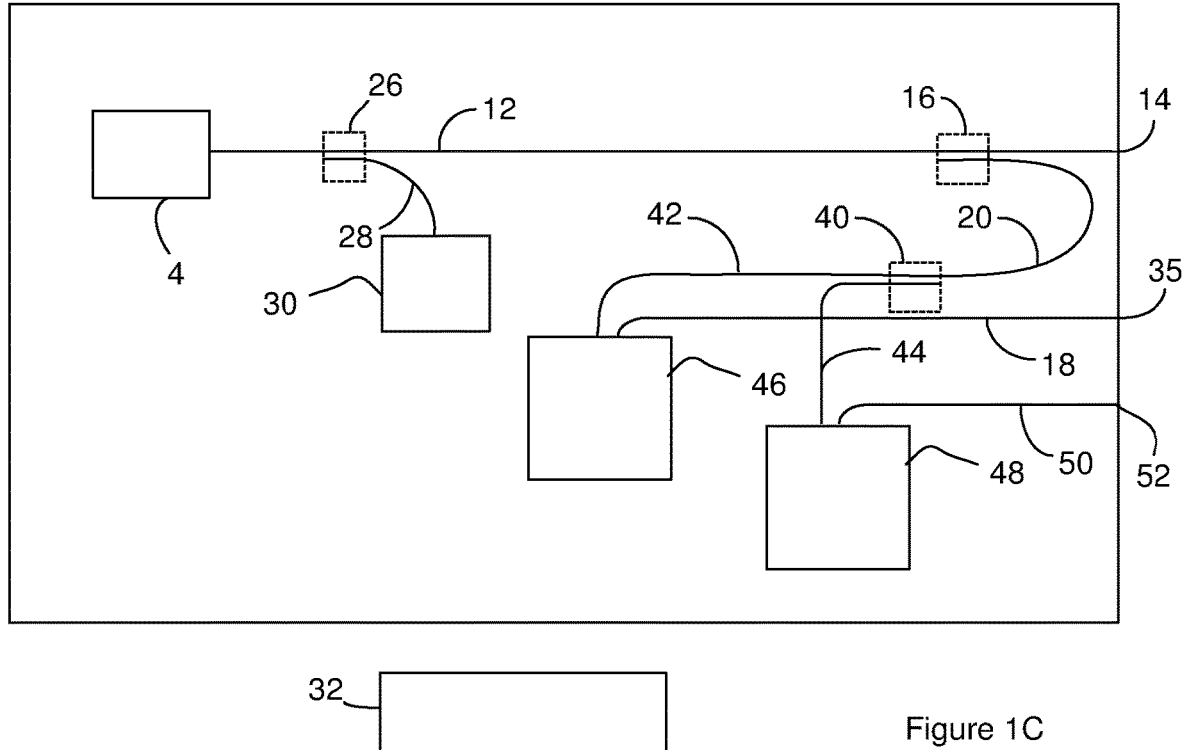
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first processing component 46 and the second reference waveguide 44 carries the second reference signal to a second processing component 48. Examples of suitable splitters 40 include, but are not limited to, y-junctions, optical couplers, and multimode interference couplers (MMIs).

The outgoing LIDAR signal exits the LIDAR chip through the facet 14 and serves as the LIDAR output signal. When light from the LIDAR output signal is reflected by one or more object located external to the LIDAR core, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first processing component 46 for further processing.

Additionally, when light from the LIDAR output signal is reflected by one or more object located external to the LIDAR core, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second processing component 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figures 2, 3:
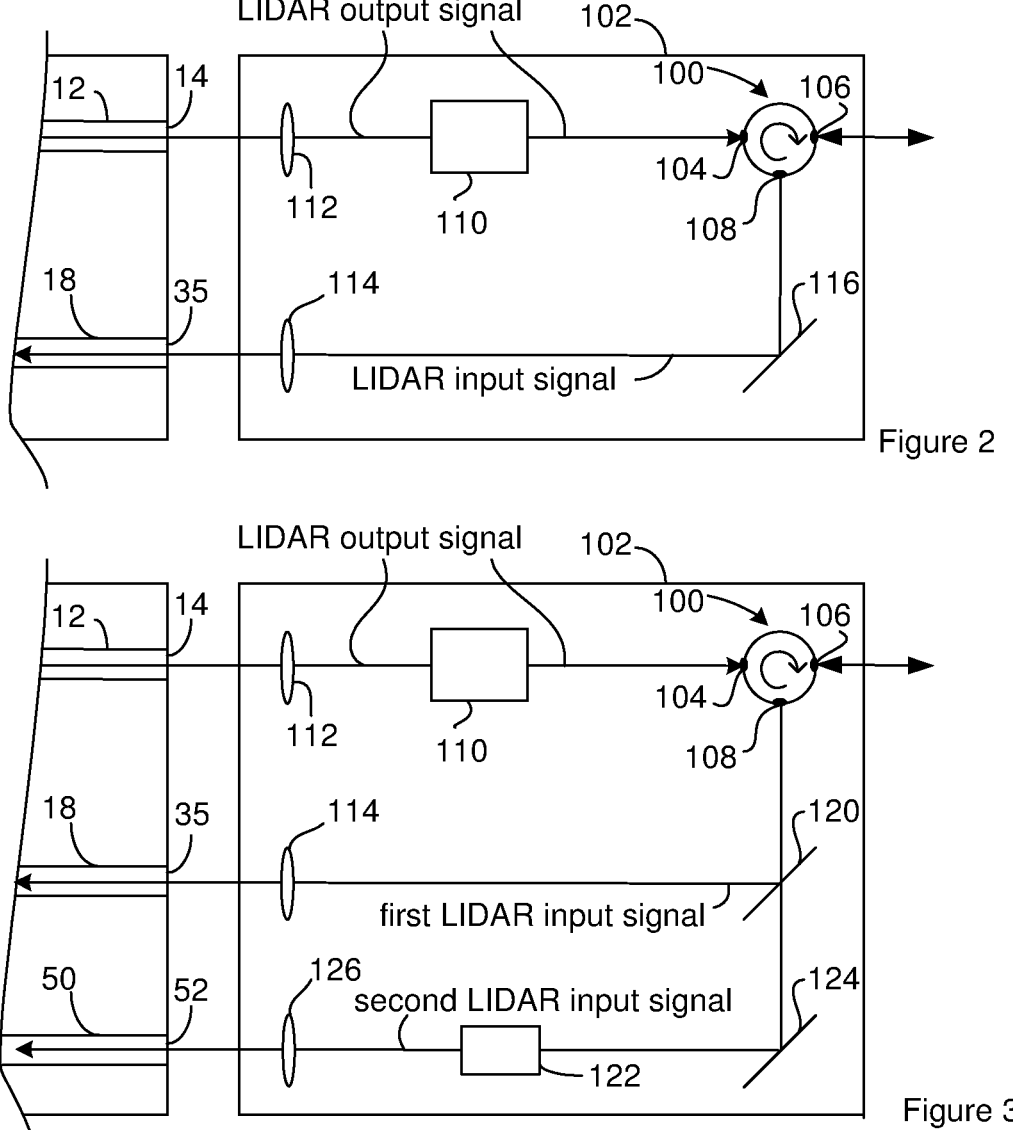
FIG. 2 is a topview of an example of a LIDAR adapter that is suitable for use with the LIDAR chip of FIG. 1B.
FIG. 3 is a topview of an example of a LIDAR adapter that is suitable for use with the LIDAR chip of FIG. 1C.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR core. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR core, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the environment and/or atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR core can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR core can be modified to compensate for changes in polarization state of the LIDAR output signal.

FIG. 3 illustrates the LIDAR core of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multimode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first processing component 46 and second composite signals generated by the second processing component 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR core and the reflecting object determined from the composite signal with the distance determined from the second composite signal and/or the electronics can average the radial velocity between the LIDAR core and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR core. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR core compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
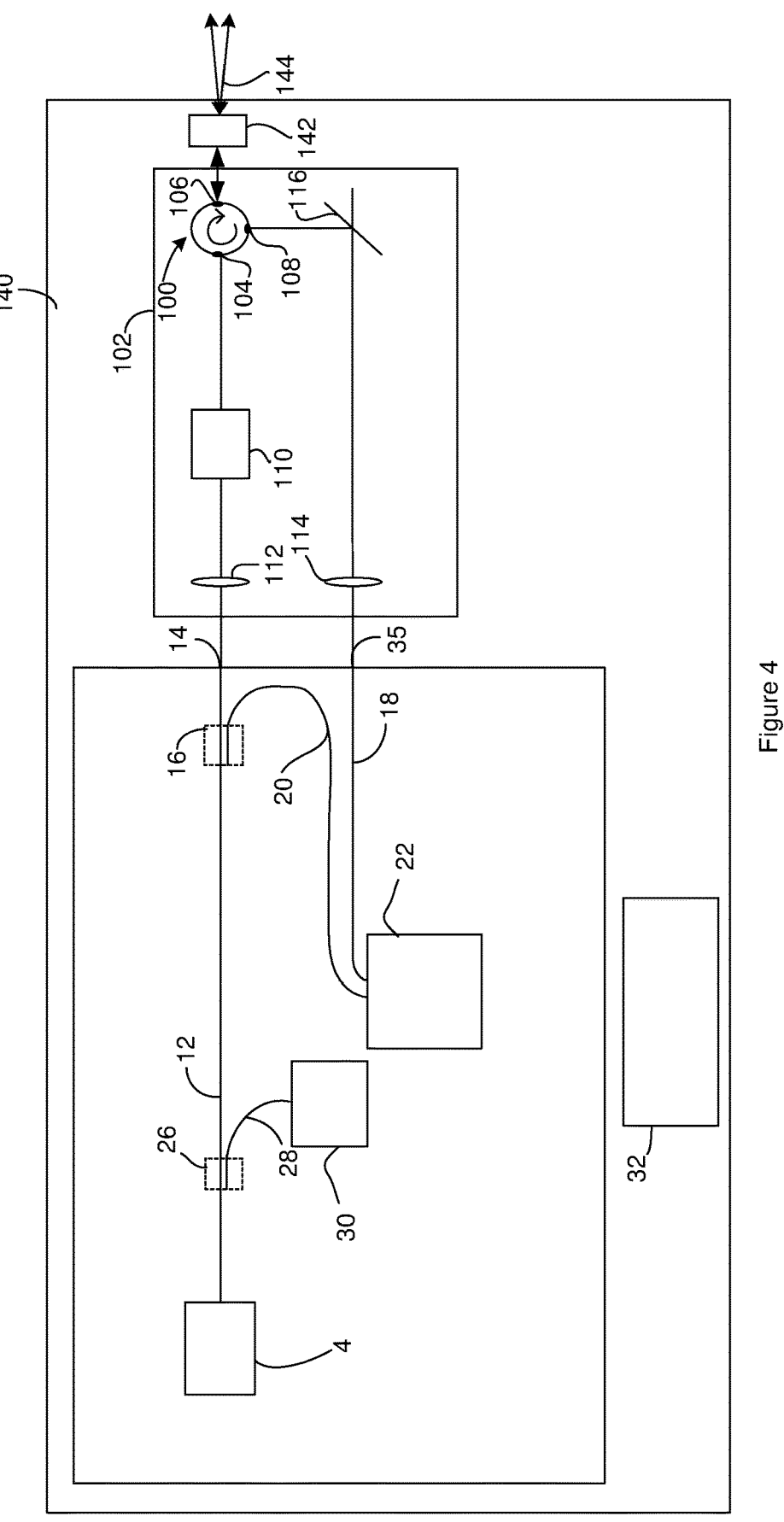
FIG. 4 is a topview of an example of a LIDAR system that includes the LIDAR chip of FIG. 1A and the LIDAR adapter of FIG. 2 on a common support.

When the LIDAR core includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR core that includes the LIDAR chip and electronics 32 of FIG. 1A and the LIDAR adapter of FIG. 2 on a common support 140. Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

Figure 5A:
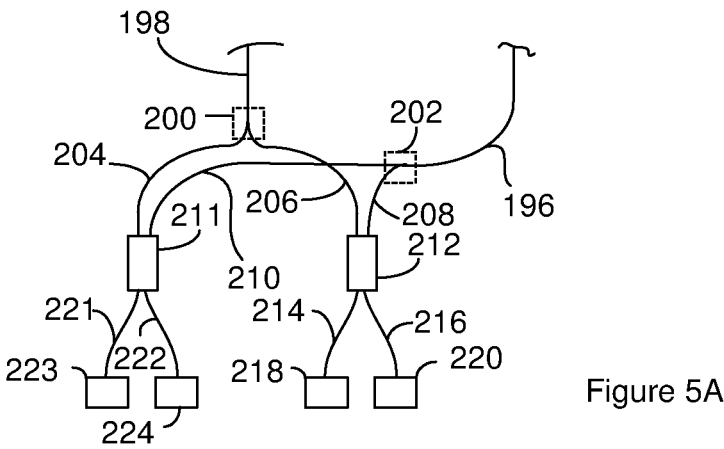
FIG. 5A illustrates an example of a processing component suitable for use with the LIDAR systems.
Figure 5B:
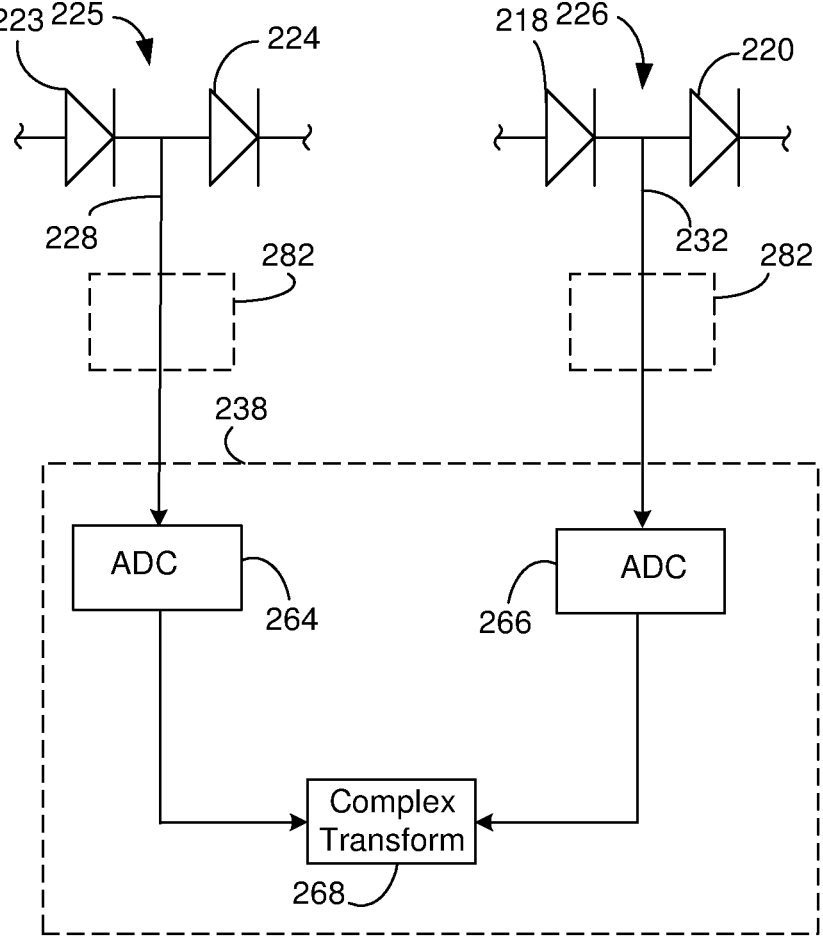
FIG. 5B provides a schematic of electronics that are suitable for use with a processing component constructed according to FIG. 5A.
Figure 5C:
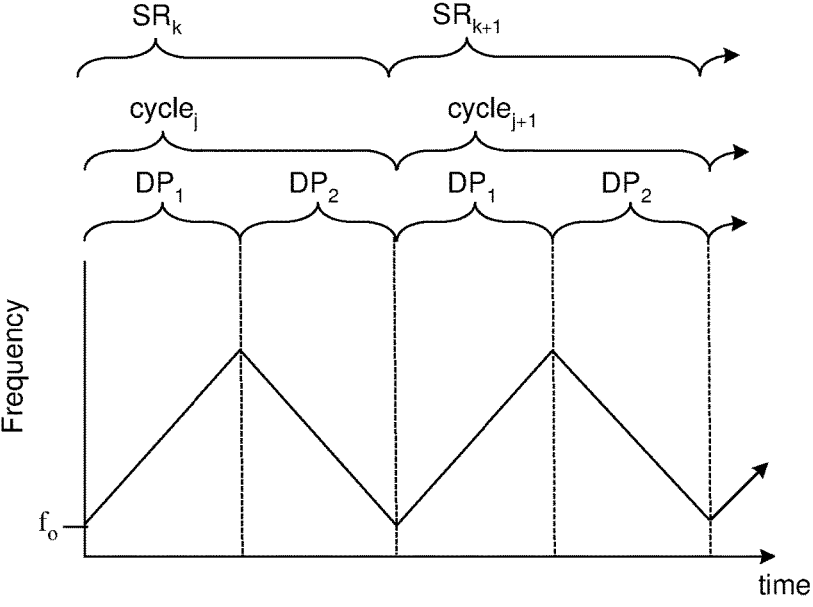
FIG. 5C is a graph of frequency versus time for a system output signal.

FIG. 5A through FIG. 5C illustrate an example of a suitable processing component for use as all or a fraction of the processing components selected from the group consisting of the processing component 22, the first processing component 46 and the second processing component 48. The processing component receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The processing component includes a second splitter 200 that divides the comparative signal carried on the comparative waveguide 196 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing component includes a first splitter 202 that divides the reference signal carried on the reference waveguide 198 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 32 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR core). The transform component 268 can execute the attributed functions using firmware, hardware or software or a combination thereof.

Although FIG. 5A illustrates light-combining components that combine a portion of the reference signal with a portion of the comparative signal, the processing component can include a single light-combining component that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

The electronics tune the frequency of the system output signal over time. The system output signal has a frequency versus time pattern with a repeated cycle. FIG. 5C shows an example of a suitable frequency versus time pattern for the system output signal. The base frequency of the system output signal ($f_o$) can be the frequency of the system output signal at the start of a cycle.

FIG. 5C shows frequency versus time for a sequence of two cycles labeled $cycle_j$ and $cycle_{j+1}$. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes M data periods that are each associated with a period index m and are labeled $DP_m$. In the example of FIG. 5C, each cycle includes three data periods labeled $DP_m$ with m=1 and 2. In some instances, the frequency versus time pattern is the same for the data periods that correspond to each other in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_m$, the electronics operate the light source such that the frequency of the system output signal changes at a linear rate am (the chirp rate). In FIG. 5C, $\alpha_2 = -\alpha_1$.

FIG. 5C labels sample regions that are each associated with a sample region index k and are labeled $SR_k$. FIG. 5C labels sample regions $SR_{k-1}$ through $SR_{k+1}$. Each sample region is illuminated with the system output signal during the data periods that FIG. 5C shows as associated with the sample region. For instance, sample region $SR_{k+1}$ is illuminated with the system output signal during the data period labeled $DP_2$ within cycle j+1 and the data period labeled $DP_1$ within cycle j+1. Accordingly, the sample region labeled $SR_{k+1}$ is associated with the data periods labeled $DP_1$ and $DP_2$ within cycle j+1. The sample region indices k can be assigned relative to time. For instance, the samples regions can be illuminated by the system output signal in the sequence indicated by the index k. As a result, the sample region $SR_{10}$ can be illuminated after sample region $SR_9$ and before $SR_{11}$.

The frequency output from the Complex Fourier transform represents the beat frequency of the composite signals that each includes a comparative signal beating against a reference signal. The beat frequencies from two or more different data periods that are associated with the same sample region can be combined to generate the LIDAR data. For instance, the beat frequency determined from $DP_1$ during the illumination of sample region $SR_k$ can be combined with the beat frequency determined from $DP_2$ during the illumination of sample region $SR_k$ to determine the LIDAR data for sample region $SR_k$. As an example, the following equation applies during a data period where electronics increase the frequency of the outgoing LIDAR signal during the data period such as occurs in data period $DP_1$ of FIG. 5C: $f_{ub} = -f_d + \alpha_u \tau$ where $f_{ub}$ is the frequency provided by the transform component, $f_d$ represents the Doppler shift ($f_d = 2V_k f_c/c$) where $f_c$ represents the optical frequency ($f_o$), c represents the speed of light, $V_k$ is the radial velocity between the reflecting object and the LIDAR core where the direction from the reflecting object toward the chip is assumed to be the positive direction, c is the speed of light, and au represents a chirp rate ($\alpha_m$) for the data period where the frequency of the system output signal increases with time ($\alpha_1$ in this case). The radial velocity can be a relative radial velocity since the LIDAR core and the object can both be in motion or the LIDAR core and/or the object can be stationary.

The following equation applies during a data period where electronics decrease the frequency of the outgoing LIDAR signal such as occurs in data period $DP_2$ of FIG. 5C: $f_{db} = -f_d - \alpha_d \tau$ where $f_{db}$ is a frequency provided by the transform component, and $\alpha_d$ represents the chirp rate ($\alpha_m$) for the data period where the frequency of the system output signal increases with time ($\alpha_2$ in this case). In these two equations, $f_d$ and $\tau$ are unknowns. These equations can be solved for the two unknowns and the electronics can then determine the radial velocity for sample region k ($V_k$) from the Doppler shift ($V_k = c*f_d/(2f_c)$) and/or the separation distance for sample region k ($R_k$) can be determined from $c*\tau/2$.

When a LIDAR core includes a processing unit constructed as disclosed in the context of FIG. 5A through FIG. 5C and the electronics are configured to calculate the radial velocity and distance between the LIDAR core and the objects for each of the sample regions, the LIDAR core is suitable for use as a range and velocity core. However, a LIDAR core can include a processing unit constructed as disclosed in the context of FIG. 5A through FIG. 5B and the electronics can be configured to calculate the radial velocity without calculating the distance. In these instances, the LIDAR core is suitable for use as a velocity core.

In an example of a velocity core, the electronics can operate the light source 4 such that the system output signal with a frequency that is a function of time disclosed in the context of FIG. 5C is replaced by a system output signal where the frequency of the system output signal is not a function of time. For instance, the frequency of the system output signal can be constant during each of the data periods shown in FIG. 5C. As an example, the system output signal can be a continuous wave (CW). For instance, the outgoing LIDAR signal, and accordingly the system output signal, can be an unchirped continuous wave (CW). As an example, the outgoing LIDAR signal, and accordingly the LIDAR output signal, can be represented by Equation 2: $G*\cos(H*t)$ where G and H are constants and t represents time. In some instances, G represents the square root of the power of the outgoing LIDAR signal.

Since the frequency of system output signal is constant, changing the distance between reflecting object and LIDAR chip does not cause a change to the frequency of the LIDAR input signal. As a result, the separation distance does not contribute to the shift in the frequency of the LIDAR input signal relative to the frequency of the LIDAR output signal. Accordingly, the effect of the separation distance has been removed or substantially from the shift in the frequency of the LIDAR input signal relative to the frequency of the system output signal.

A velocity core can have a processing unit constructed as disclosed in the context of FIG. 5A and FIG. 5B. As discussed above in the context of FIG. 5B, the first Analog-to-Digital Converter (ADC) 264 receives the first data signal 228 and outputs a first digital data signal. The second Analog-to-Digital Converter (ADC) 266 receives the second data signal and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform component 268 receives the complex data signal. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. Since the frequency shift provided by the transform component 268 does not have input from a frequency shift due to the separation distance between the reflecting object and the LIDAR chip, and because of the complex nature of the velocity data signal, the output of the transform component 268 can be used to calculate the radial velocity between the reflecting object and the LIDAR chip. For instance, the electronics can approximate the radial velocity between the reflecting object and the LIDAR chip (v) using Equation 4: $v = c*f_d/(2*f_c)$ where $f_d$ is approximated as the peak frequency output from the transform component 268, c is the speed of light, and $f_c$ represents the frequency of the LIDAR output signal. As a result, multiple data periods and/or chirping are not needed for a velocity core to calculate the radial velocity.

The first Analog-to-Digital Converter (ADC) 264 converts the first data signal to the first digital data signal by sampling the first data signal at a sampling rate. Similarly, the second Analog-to-Digital Converter (ADC) 266 converts the second data signal to the second digital data signal by sampling the second data signal at a sampling rate. When a velocity core uses a continuous wave as a first data signal and a second data signal, the effects of distance between the reflecting object and LIDAR chip are effectively removed from the beating of the composite signal and the resulting electrical signals. Accordingly, the beat frequency of the composite signal is reduced and the required sampling rate is reduced. For instance, the sampling rate of the Analog-to-Digital Converters in a range and velocity core can be on the order of 4 GSPS. In contrast, the sampling rate of the Analog-to-Digital Converters in a velocity core can be on the order of 400 MSPS.

Although the processing component of FIG. 5A and FIG. 5B are disclosed in the context of a complex data signal, a real data signal can be used. As a result, the processing component of FIG. 5A and FIG. 5B can be modified so as to exclude the components associated with the second data signal together and the transform component 268 can be configured to real Fourier Transform (FFT). Accordingly, the processing component can include a single light-combining component 211 and a single Analog-to-Digital Converters (ADC).

Figure 6A:
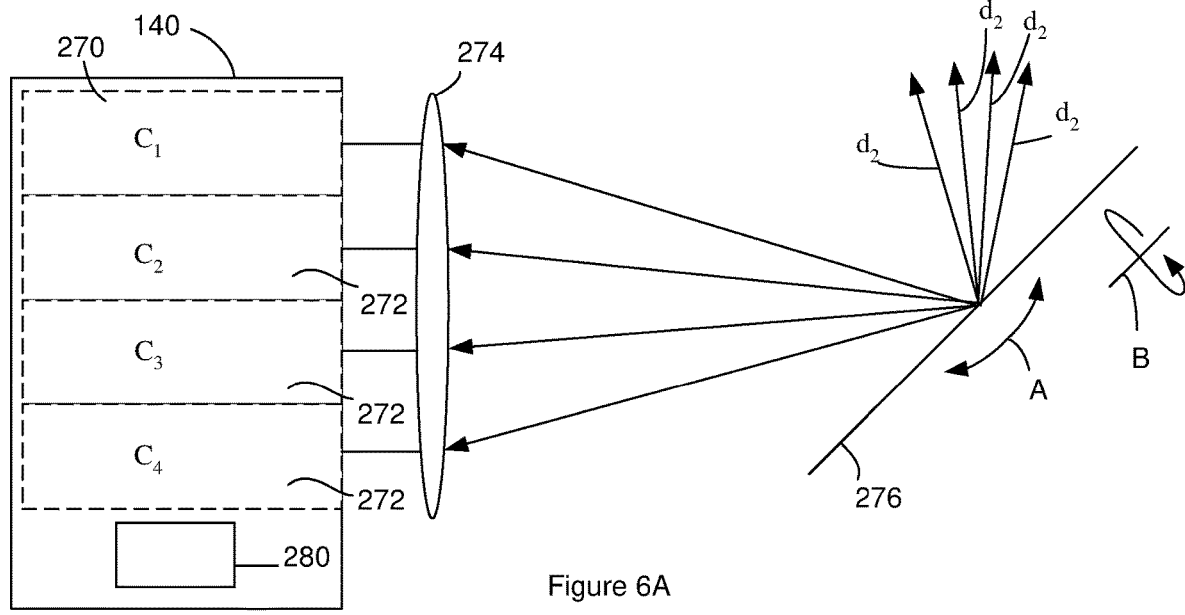
FIG. 6A illustrates a LIDAR system that includes multiple different cores on a common support.

A LIDAR system can include one or more range and velocity cores and one or more velocity cores. As an example, FIG. 6A illustrates a LIDAR system that includes multiple different cores on a common support 140. Each of the LIDAR cores can be constructed as disclosed in the context of FIG. 1A through FIG. 5 or can have an alternate construction. One or more of the LIDAR cores can be a velocity core and one or more of the LIDAR cores can be a range and velocity core. For the purpose of illustration, the LIDAR cores in the LIDAR system of FIG. 6A include one range and velocity core 270 and three velocity cores 272.

Each of the LIDAR cores outputs a different system output signal. The system output signal are each received by a redirection component 274 that re-directs the system output signals. Suitable redirection component 274 include, but are not limited to, convex lenses and concave mirrors. The system output signal output from the collimator 274 are received by one or more beam steering components 276 that output the system output signals. The direction that the system output signal travels away from the LIDAR system is labeled $d_2$ in FIG. 6A. The electronics can operate the one or more beam steering components 276 so as to steer the each of the system output signal to different sample regions in a field of view. As is evident from the arrows labeled A and B in FIG. 6A, the one or more beam steering components 276 can be configured such that the electronics can steer the system output signals in two dimensions or in three dimensions. As a result, the one or more beam steering components 276 can function as a beam-steering mechanism that is operated by the electronics so as to steer the system output signals within the field of view of the LIDAR system. Suitable beam steering components 276 include, but are not limited to, movable mirrors, MEMS mirrors, optical phased arrays (OPAs), optical gratings, and actuated optical gratings. In some instances, the redirection component 274 and/or the one or more beam steering components 276 are configured to operate on the system output signals such that the system output signals are collimated or substantially collimated as they travel away from the LIDAR system. Additionally or alternately, the LIDAR system can include one or more collimating optical components (not illustrated) that operate on the system output signals such that the system output signals are collimated or substantially collimated as they travel away from the LIDAR system.

As noted above, the sampling rates for the ADCs on the velocity cores can be lower than the sampling rates for the ADCs on the range and velocity cores. In some instances, the LIDAR assembly includes velocity cores having ADCs with sampling rates greater than 100, 200, or 300 and less than 500, 800, or 1000 MSPS (mega-samples per second) and/or the range and velocity cores having ADCs with sampling rates greater than 1, 2, or 3 and less than 5, 8, or 10 GSPS (giga-samples per second). In some instances, a ratio of the sampling rates for the ADCs on the one or more velocity cores to the sampling rates on the one or more range and velocity cores is greater than 2:1, 5:1, or 10:1 and less than 15:1, 50:1, or 100:1. Additionally or alternately, the velocity cores can be lower bandwidth cores than the range and velocity cores. As an example, the light detectors in the velocity cores can be used with Transimpedance Amplifiers (TIAs) that convert the current of the resulting data signal output from the light detectors to a voltage. For instance, FIG. 5B illustrates Transimpedance Amplifiers 282 that are optionally positioned along the first data line 228 and the second data line 232 so as to convert the current of the first data signal to a voltage and so as to convert the current of the second data signal to a voltage. The Transimpedance Amplifiers (TIAs) and the associated circuitry in the one or more velocity cores can be configured to operate at lower bandwidth than the Transimpedance Amplifiers (TIAs) and the associated circuitry in the one or more range and velocity cores. In some instances, the LIDAR assembly includes one or more velocity cores that operate at a bandwidth range of more than 0.1 Gz, 0.2 Gz, or 0.3 Gz and less than 0.5 Gz, 1 Gz, or 2 Gz and one or more range and velocity cores that operate at a bandwidth range of more than 0.5 Gz, 1 Gz, or 1.5 Gz and less than 2 Gz, 3 Gz, or 5 Gz. In some instances, a ratio of the bandwidth for the one or more range and velocity cores: the bandwidth for the one or more velocity cores is greater than 2:1, 4:1, or 8:1 and less than 10:1, 15:1, or 20:1. The reduced bandwidth requirements of the velocity cores relative to the range and velocity cores allows the velocity cores to operate at lower frequencies and accordingly reduces the costs associated with the components on the velocity cores. In some instances, the LIDAR assembly includes one or more velocity cores that have TIAs that operate at a bandwidth range of more than 0.1 Gz, 0.2 Gz, or 0.3 Gz and less than 0.5 Gz, 1 Gz, or 2 Gz and one or more range and velocity cores that have TIAs that operate at a bandwidth range of more than 0.5 Gz, 1 Gz, or 1.5 Gz and less than 2 Gz, 3 Gz, or 5 Gz. In some instances, a ratio of the bandwidth for the TIAs in the one or more range and velocity cores: the bandwidth for the TIAs in the one or more velocity cores is greater than 2:1, 4:1, or 8:1 and less than 10:1, 15:1, or 20:1.

Figure 6B:
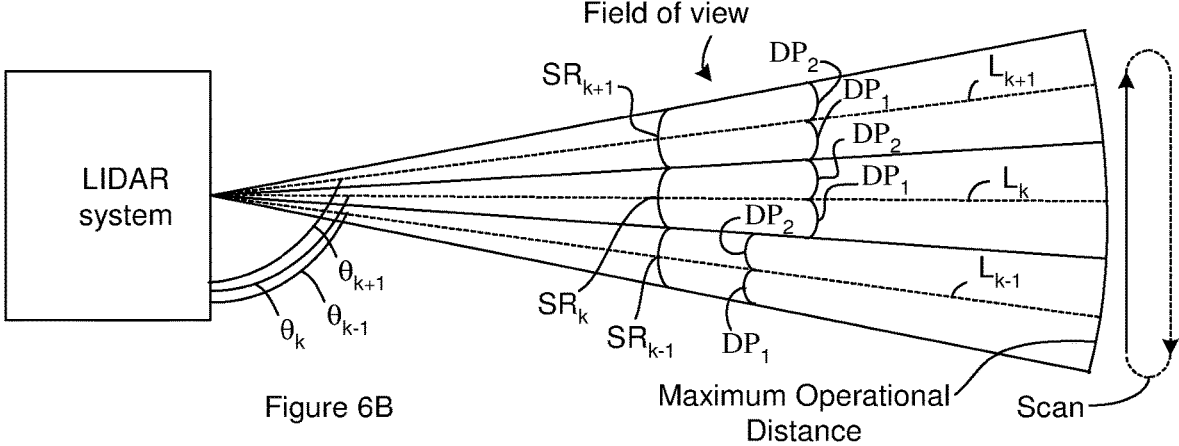
FIG. 6B illustrates a relationship between data periods disclosed in FIG. 5C and the field of view for the LIDAR system.

FIG. 6B illustrates a relationship between the data periods disclosed in FIG. 5C and the field of view for the LIDAR system. For the purposes of illustration, only the system output signal for range and velocity core $C_1$ is illustrated. The field of view is defined by a collection of sample regions labeled $SR_{k-1}$ through $SR_{k+1}$. The illustrated system output signal is scanned in the direction of the solid line labeled "scan." The system output signal is scanned through a series of the sample regions ($SR_{k-1}$ through $SR_{k+1}$). The collection of sample regions that are scanned by the system output signal make up the field of view for the LIDAR system. Object(s) in the field of view can change with time. As a result, the locations of the sample regions are determined relative to the LIDAR system rather than relative to the environment in which the LIDAR system is positioned. For instance, the sample regions can be defined as being located within a range of angles relative to the LIDAR system. The dashed line labeled scan in FIG. 6B illustrates that the scan of the sample regions can be repeated in multiple scan cycles. Accordingly, each scan cycle can scan the system output signal through the same sample regions when the objects in the field of view have moved and/or changed. The sample regions in the field of view can be scanned in the same sequence during different scan cycles or can be scanned in different sequences in different scan cycles.

The portion of each sample region that corresponds to one of the data periods are each labeled $DP_1$ or $DP_2$ in FIG. 6B. As is evident from FIG. 5C, the chirp rate of the system output signal from core $C_1$ during data period $DP_1$ is $\alpha_1$ and the chirp rate during the data period $DP_2$ is $\alpha_2$. As noted above, the system output signals from the velocity cores $C_2$-$C_4$ may not be frequency chirped and may have a constant frequency.

Each of the sample regions includes a dashed line labeled $L_k$. The dashed line labeled $L_k$ can serve as a location reference line for sample region k. FIG. 6B includes location reference lines labeled $L_{k-1}$ through $L_{k+1}$. In FIG. 6B, each of the location reference lines ($L_k$) is drawn along the longitudinal axis of sample region with sample region index k.

FIG. 6B illustrate multiple orientation angles labeled $\theta_k$ where k represents the sample region index k. The orientation angle $\theta_k$ can measure the angular orientation of sample region $SR_k$ relative to the LIDAR system. In some instances, the orientation angles $\theta k$ are measured relative to the location reference lines $L_k$ as shown in FIG. 6B. As a result, the orientation angles $\theta_k$ can measure the angular orientation of the location reference lines $L_k$. Because FIG. 6B illustrates the LIDAR system having a two-dimensional field of view, a single angle ($\theta_k$) can define the angular orientation of sample region $SR_k$ relative to the LIDAR system; however, the field of view is generally three dimensional. As a result, the LIDAR system can use two or more angles and/or other variables to define the orientation of a sample region relative to the LIDAR system.

Figure 6C:
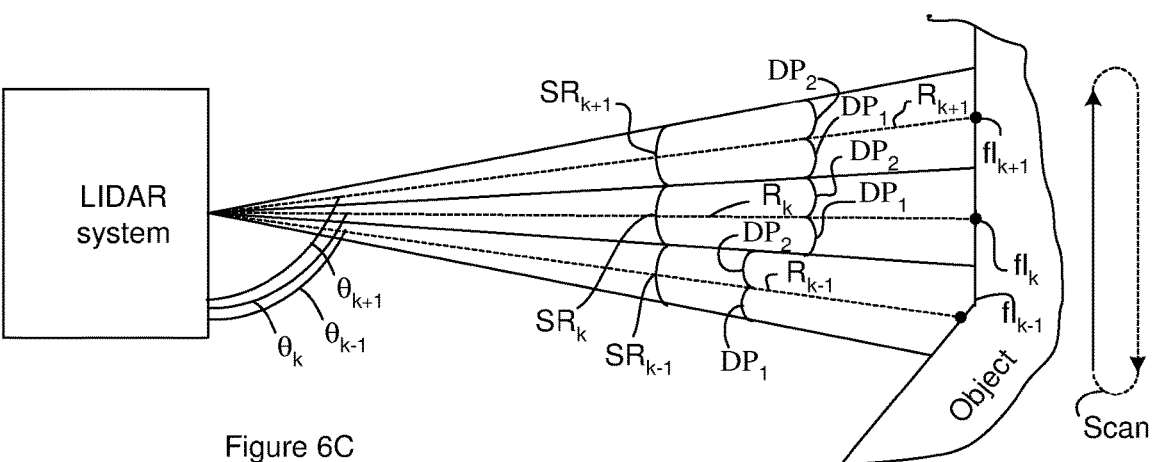
FIG. 6C illustrates objects in the field of view disclosed in the context of FIG. 6B.

FIG. 6C illustrates objects in the field of view disclosed in the context of FIG. 6B. For instance, two different objects located are located in the field of view of the LIDAR system. Each of the location reference lines ($L_k$) extends a distance $R_k$ from the LIDAR system to a field location labeled $fl_k$. The distance $R_k$ represents the value that the electronics in the range and velocity core determine for the distance between the LIDAR system and an object as a result of the system output signal transmitted during illumination of sample region $SR_k$. As a result, the field location labeled $fl_k$ can represent the location along the location reference line ($L_k$) where the electronics determine that a surface of an object that reflects the system output signal is located. The collection of field locations in the field of view can serve as a point cloud.

The field locations ($fl_k$) that are associated with a distance, $R_k$, can also be associated with a radial velocity $V_k$ where k represents the sample region index. The radial velocity $V_k$ can be the radial velocity that the electronics generate for sample region with sample region index k. When the core is a velocity core, the core generates the radial velocity $V_k$ but does not generate the distance, $R_k$.

Figure 6D:
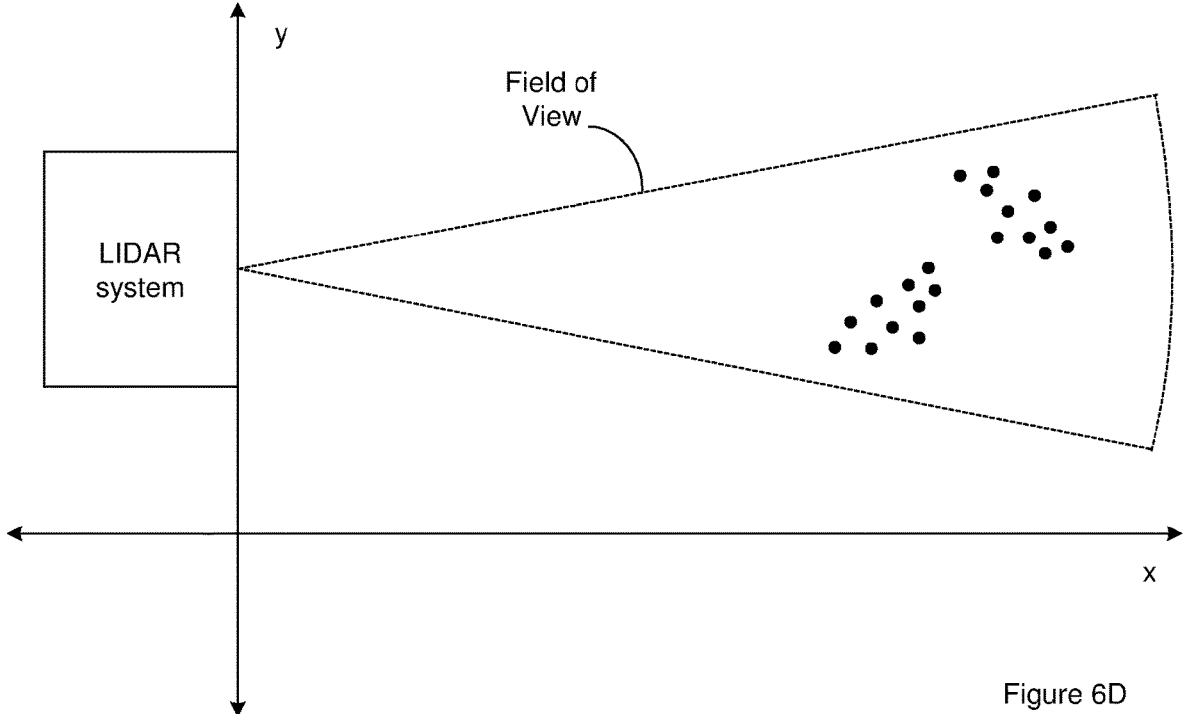
FIG. 6D illustrates multiple different field locations in the sample regions of illuminated by a range and velocity core.

The one or more orientation angle(s) ($\theta_k$) and the distances $R_k$ associated with each field location ($fl_k$) can effectively serve as polar coordinates or as spherical coordinates. As a result, the electronics can optionally convert the coordinates of the field locations $fl_k$ to other coordinates systems including, but not limited to, Cartesian coordinates. As an example, FIG. 6D illustrates an example where multiple different field locations in the sample regions of the range and velocity core $C_1$. Additionally, the axes of a Cartesian coordinate system are transposed on the field of view. As a result, the positions of the field locations $fl_k$ are also shown relative to the Cartesian coordinate system. The electronics can optionally use the orientation angle ($\theta_k$) and the distance $R_k$ associated with each field location ($fl_k$) to convert the field location ($fl_k$) to the other coordinate systems.

In some instances, a field location ($fl_k$) is not present in all or a portion of the sample regions. For instance, when an object is not present in a sample region ($SR_k$), a beating signal is generally not produced and LIDAR data is not generated for that sample region. As a result, a portion of the sample region indices may not be associated with a field location ($fl_k$).

When a core is a range and velocity core, all or a portion of the sample regions illuminated by that core (range and velocity sample regions, RV sample regions) can each be associated with a field location, coordinates, distances $R_k$, and a radial velocity $V_k$. In contrast, when a core is a velocity core, all or a portion of the sample regions illuminated by that core (velocity sample regions, V sample regions) can each be associated with a field location, coordinates, and a radial velocity $V_k$. FIG. 6B illustrates the coordinates as two-dimensional Cartesian coordinates (x,y) although three-dimensional coordinates and/or other coordinates systems are possible. In some instances, the coordinates are the polar coordinates or spherical coordinates of the field locations ($fl_k$).

Figure 7:
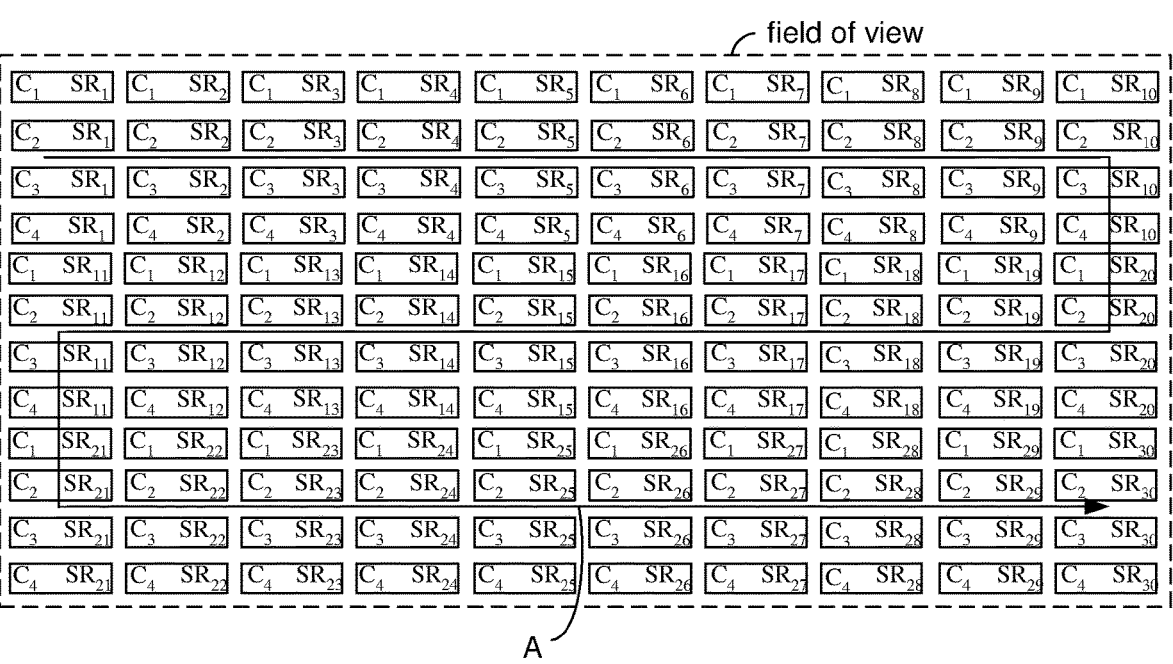
FIG. 7 is a two-dimensional illustration of a field of view for a LIDAR system.

FIG. 7 is a two-dimensional illustration of the field of view for the LIDAR system. For instance, FIG. 7 can represent a projection of a three-dimensional field of view onto a two-dimensional plane. The field of view includes multiple rectangles that can each represent the projection of one of the sample regions in the field of view onto the plane. The sample regions are shown as rectangular for the purposes of illustration and can have other geometries. The sample regions are each labeled $SR_k$ where k is from 1 to 30.

The sample regions are each labeled $C_i$ where i is a core index that identifies the core that illuminated the sample region. The core index is an integer can extend from i=1 to i=M where M is the number of system output signals output by the LIDAR system. The labels $C_i$ indicate which of the system output signals illuminated the sample region. For instance, the sample regions labeled $C_1$ were illuminated by the LIDAR system labeled $C_1$ in FIG. 6A. Accordingly, the sample regions labeled $C_1$ are RV sample region. In contrast, the sample regions labeled $C_2$ were illuminated by the velocity core labeled $C_2$; the sample regions labeled $C_3$ were illuminated by the velocity core labeled $C_3$; and the sample regions labeled $C_4$ were illuminated by the velocity core labeled $C_4$. As a result, a velocity and range is calculated for all or a portion of the rectangles labeled $C_1$. In contrast, a velocity is calculated for all or a portion of the sample regions labeled $C_2$ through $C_4$.

FIG. 7 includes an arrow labeled A. The arrow indicates the sequence that the system output signals are scanned through the field of view. Additionally, the sample region indices (k) are assigned to the sample regions chronologically. Accordingly, the sample region labeled with $C_2$ and $SR_{11}$ was scanned by the velocity core $C_1$ before the sample region labeled with $C_2$ and $SR_{12}$ was scanned by the velocity core $C_2$.

The electronics 32 can be local electronics in that they are specific to each of the cores on the LIDAR system. The LIDAR system can include common electronics 280 in addition to the locate electronics 32. The common electronics 280 can be positioned on the common support 140 as shown in FIG. 7 or can be located off of the common support 140. The common electronics 280 can be in the same physical location and/or housing as the local electronics associated with different cores or can be in different locations and/or housings from the local electronics 32 associated with different cores.

The common electronics can be in electrical communication with the local electronics 32 associated with different cores. As a result, the common electronics 280 can access LIDAR data generated from different cores. For instance, the common electronics 280 can access the range and or velocity that the local electronics 32 associated with a range and velocity core calculates for a sample region and/or can access the velocity that the local electronics 32 associated with a velocity core calculates for a sample region.

The electronics can combine the LIDAR data accessed from different cores so as to approximate the range data for V sample regions. For instance, the coordinates of a field location for a V sample region can be interpolated or extrapolated from the coordinates of the field locations associated with RV sample regions. When the coordinates are polar coordinates or spherical coordinates, the range (distance) for subject sample region k ($R_k$) can be extracted directly from the coordinates. Alternately, a range (distance) for sample region k ($R_k$) can be calculated from the coordinates. For instance, when the coordinates are Cartesian coordinates, the coordinates can be converted to polar coordinates or spherical coordinates and the desired range extracted. In some applications of the LIDAR system, the desired data for the V sample regions is the coordinates of the filed location for that sample region rather than the range. As a result, in some applications, the range is not calculated for all or a portion of the V sample regions for which coordinates are calculated. The range and/or coordinates estimated for a V sample region can serve as location data for the V sample region. Accordingly, interpolation and extrapolation provide an estimate of the location data of an object in a subject sample region. The interpolation or extrapolation is made relative to coordinates and/or ranges from multiple RV sample regions. The field locations in the RV sample regions from which the location data for a V region is calculated serve as the known points in an interpolation or extrapolation algorithm.

Figure 8:
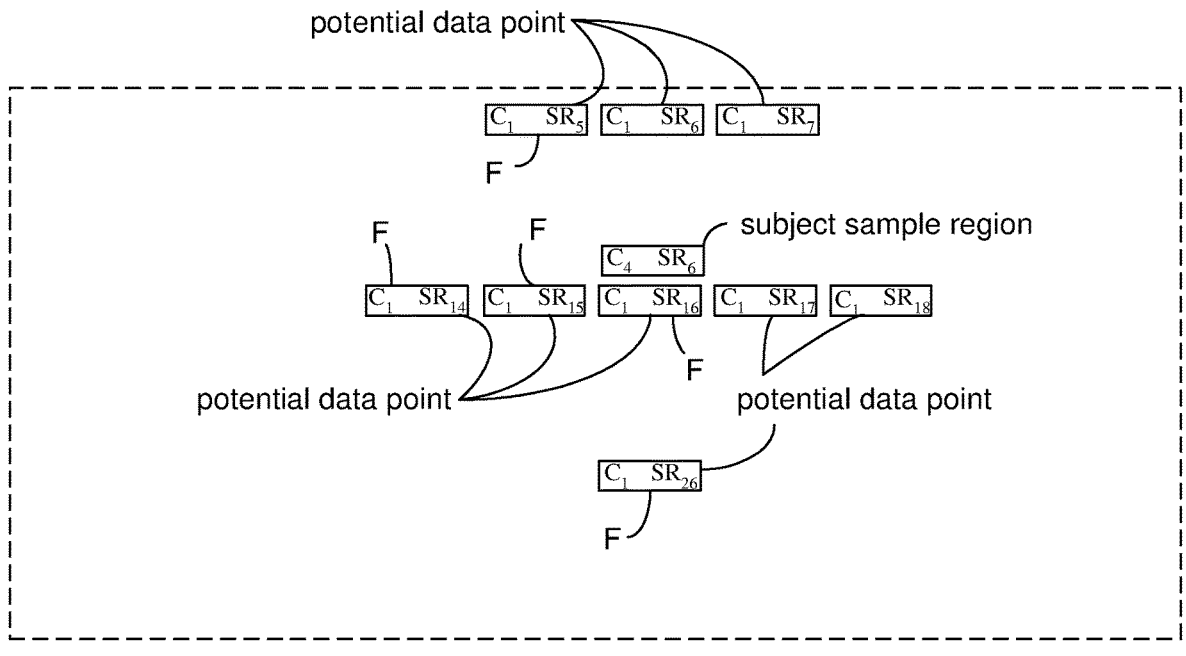
FIG. 8 shows a subject sample region and potential sample regions in the field of view from FIG. 7.

The electronics can identify a subject sample region for which the coordinates and/or a range is to be interpolated or extrapolated and can identify potential sample regions that include potential data points from which the coordinates and/or range is to be interpolated or extrapolated. As an example, FIG. 8 shows the field of view from FIG. 7 where the sample region labeled $SR_6$ for core $C_4$ is identified as the subject sample region. The potential data points include the field locations in RV sample regions that are physically located near the subject sample region. Since the core labeled $C_1$ is the only range and velocity core in the LIDAR system of FIG. 6A, each of the potential data points is labeled $C_1$.

The electronics can apply an identification algorithm to identify the potential data points. The identification algorithm can associate a particular group of RV sample regions with each of the different possible subject sample regions. The association can be specific to each of the possible subject sample regions or can be general to multiple different possible subject sample regions. As an example of a specific association, the identification algorithm can associate the group of potential data points shown in FIG. 8 with the specific subject sample region shown in FIG. 8. As an example of a general association, the identification algorithm can associate the pattern of potential data points shown in FIG. 8 with multiple different subject sample regions that are each positioned in the same row of sample regions as the subject sample region of FIG. 8.

In in another example of suitable identification algorithms, the potential data points can be identified by application of an identification criteria to the subject sample region and the adjacent RV sample regions. For instance, each of the RV sample regions that has a field locations are within $R_{fl}$ of the field location in the subject sample region can each be identified as a potential data point where $R_{fl}$ is a constant.

The electronics can compare the LIDAR data at the potential data points to one or more criteria to determine with the potential data point is suitable for use as a known data point. In some instances, the one or more criteria include or consist of velocity criteria that are a function of the radial velocities associated with the potential data points. For instance, the electronics can compare the LIDAR data associated with the subject sample region and the data associated with each of the potential data points to one or more velocity criteria to determine whether the potential data point is suitable for use as a known data point.

The velocity criteria can be selected such that the criteria are satisfied when the same object is likely positioned in the subject sample region and in the sample region associated with a potential data point. When an object is positioned in a subject sample region and the sample region associated with a potential data point, the radial velocity calculated for these sample regions is likely the same or similar. For instance, an example application of velocity criteria can include comparing a variable that is a function of the radial velocity calculated for the subject sample region and the velocity associated with the potential data point to a threshold. The threshold can be a constant or can be function of the radial velocity calculated for the subject sample region and/or the radial velocity calculated for the potential data point. As an example, the difference between the radial velocity associated with the subject sample region and the radial velocity associated with the potential data point can be compared to a velocity threshold. When the difference is less than the velocity threshold, the velocity criteria is satisfied but when the difference is greater than or equal to the velocity threshold the velocity criteria is not satisfied. Another example of applying velocity criteria compares the percentage change from the radial velocity associated the subject sample region to the radial velocity associated with the potential data point to a velocity threshold. When the difference is less than the velocity threshold, the velocity criteria is satisfied but when the difference is greater than or equal to the velocity threshold the velocity criteria is not satisfied.

The potential data points that satisfy the one or more criteria are flagged as known data points while the potential data points that do not satisfy the one or more criteria are not flagged as known data points. As an example, the field locations in the RV sample regions labeled F in FIG. 8 can be flagged as known data points while the field locations in the RV sample regions labeled F are not flagged as known data points. The common electronics 280 use the coordinates associated with the known data points in an interpolation algorithm or extrapolation algorithm to estimate the coordinates of a field location in the subject sample region. In contrast, the potential data points that are not flagged as known data points are not used in the interpolation algorithm or extrapolation algorithm. As a result, in some instances, the number of known data points used in an interpolation algorithm or an extrapolation algorithm changes in response to the radial velocities calculated for the potential data points.

Suitable interpolation algorithms include, but are not limited to, piecewise constant interpolation, linear interpolation, polynomial interpolation, spline interpolation, interpolation by function approximation, and Gaussian interpolation. Suitable extrapolation algorithms include, but are not limited to, linear extrapolation, polynomial extrapolation, conic extrapolation, and French curve extrapolation.

Figure 9:
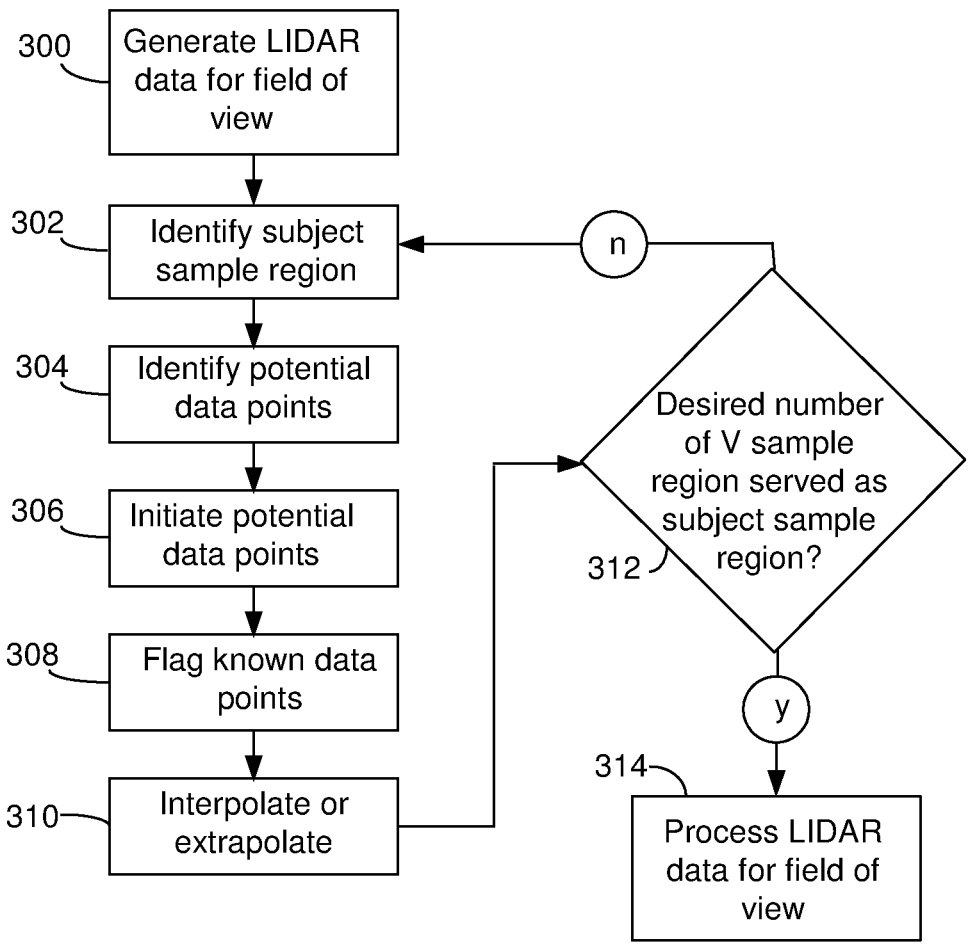
FIG. 9 is a process flow for generating range data for sample regions illuminated by a velocity core in a LIDAR system that includes range and velocity cores.

FIG. 9 is a process flow for generating range data for sample regions illuminated by a velocity core in a LIDAR system that includes range and velocity cores.

At process block 300, the local electronics for each of the cores generate the LIDAR data for the sample regions scanned by that core. For instance, the velocity cores calculate the radial velocity for each of the sample regions scanned by the core. Additionally, the range and velocity cores calculate the range and radial velocity for each of the sample regions scanned by the core. As noted above, the one or more orientation angle(s) $(\theta_k)$ associated with a sample region and the range or distance $R_k$ calculated for the sample region can effectively serve as polar or spherical coordinates for a field location in that sample region. Alternately, the local electronics can optionally convert the polar or spherical coordinates to another coordinate system. Accordingly, the local electronics associated with each of the range and velocity cores can calculate the radial velocity and coordinates of the field locations associated with the RV sample regions scanned by those cores.

At process block 302, the common electronics can identify one of the V sample regions to serve as a subject sample region for which coordinates and/or a range are to be estimated. The field location in the subject sample region can serve as a subject field location.

The common electronics can proceed from process block 302 to process block 304. At process block 304, the common electronics can perform the identification algorithm so as to identify sample regions that contain field locations that may be suitable for serving as known data points. The identified sample regions and/or field locations can serve as potential data points.

The common electronics can proceed from process block 304 to process block 306. At process block 306, the common electronics can initialize the identified potential data points and/or the sample regions that include the identified potential data points. For instance, the common electronics can flag each of the identified potential data points and/or the sample regions containing the identified potential data points as not being a known data point.

The common electronics can proceed from process block 306 to process block 308. At process block 308, the common electronics can compare the radial velocity associated with the subject field location (or the subject sample region) and the radial velocity associated with a subject one of the potential data points (or the potential sample region) to the one or more velocity criteria so as to determine whether it is likely that the same object is positioned in the sample region associated with the subject field location and also in the sample region associated with the potential field location. This comparison can be repeated until each of the potential data points has served as the subject potential data point, until a pre-determined number of potential data points has served as the subject potential data point, or until a pre-determined number of potential data points has satisfied the one or more velocity criteria. The common electronics can flag each of the potential data points that satisfies the one or more velocity criteria as a known data point.

The common electronics can proceed from process block 308 to process block 310. At process block 310, the common electronics can interpolate or extrapolate coordinates for the subject field location from the coordinates of the known data point. The potential data points that are not flagged as a known data point are not used in the interpolation or extrapolation.

In some instances, the interpolation or extrapolation of the coordinates includes an interpolation or extrapolation of the range associated with the subject field location. For instance, when the interpolation or extrapolation of the coordinates is done in polar coordinates or spherical coordinates, the range is one of the coordinate variables. Alternately, the range can be calculated from the coordinates for the subject field location. When the range is determined for a subject field location $fl_k$, the range can serve as the distance $R_k$ for the V sample region $SR_k$. As a result, the V sample region $SR_k$ can be associated with a radial velocity $V_k$. Accordingly, a V sample region that has served as the subject sample region can be associated with a field location, an estimated distance $R_k$, and a radial velocity $V_k$.

The common electronics can proceed from process block 310 to determination block 312 where a determination is made whether the desired number of V sample regions has served as the subject sample region. It can be desirable for all or a portion of the sample regions in the field of view for the LIDAR system to serve as the subject sample region. In some instances, each of the V sample regions in the field of view for the LIDAR system is to serve as the subject sample region. As a result, in some instances, the common electronics can determine whether each of the each of the V sample regions in the field of view for the LIDAR system has served as the subject sample region. When the determination is negative, the common electronics can return to process block 302.

When the determination at determination block 310 is positive, the common electronics have estimated distance $(R_k)$ values for all or a portion of the V sample regions. The estimated distance $(R_k)$ values for the V sample regions can be added to the LIDAR data for the RV regions to provide LIDAR data for the LIDAR system's field of view. As a result, all or a portion of the V sample regions in the field of view of the LIDAR system are associated with a field location, an estimated distance $R_k$, and a radial velocity $V_k$. Similarly, all or a portion of the RV sample regions in the field of view of the LIDAR system are associated with a field location, an estimated distance $R_k$, and a radial velocity $V_k$.

When the determination at determination block 310 is positive, the common electronics proceed from determination block 312 to process block 314. At process block 314, the common electronics can perform further processing of the LIDAR data for the LIDAR system's field of view. The further processing is a function of the application of the LIDAR system. Examples of further processing applications include, but are not limited to, image generation, control of self-driving vehicles, point cloud generation, object recognition, and statistical analysis. The further processing can make use of all or a portion of the ranges, radial velocities, and field locations associated with the V sample regions and associated with the RV sample regions in the field of view for the LIDAR system.

Figure 10A:
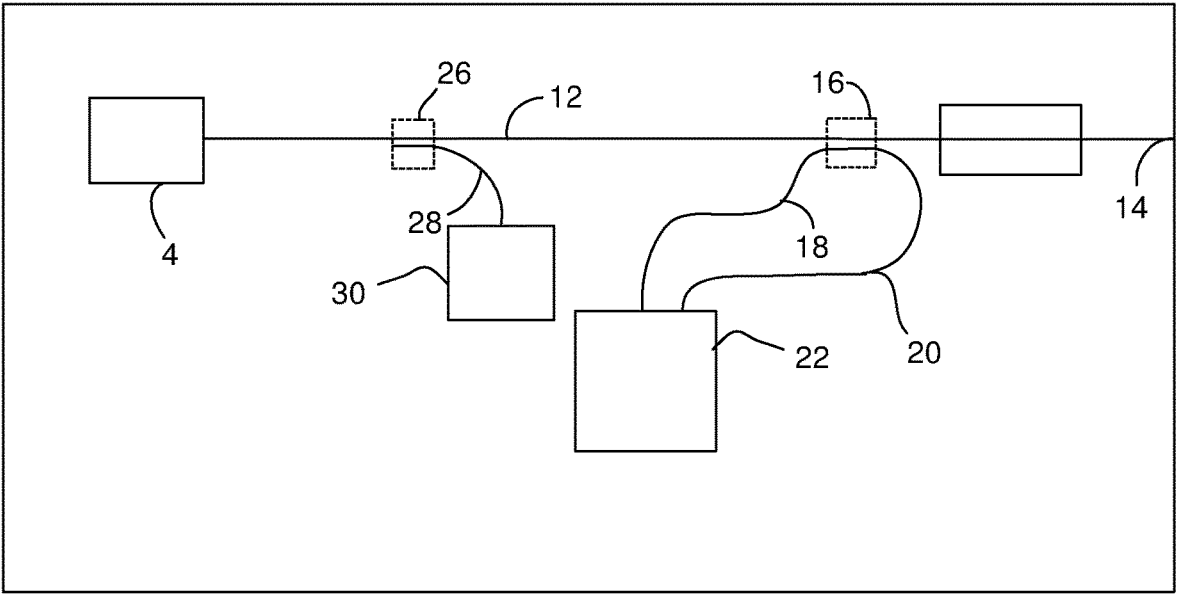
FIG. 10A is a topview of a schematic of a LIDAR core suitable for use as a velocity core.
Figure 10A:
Figure 10B:
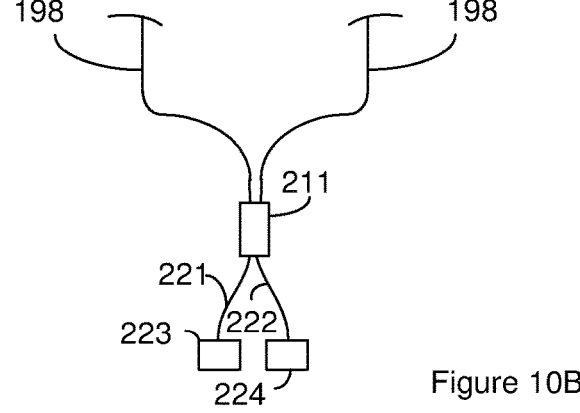
FIG. 10B is an example of a processing component suitable for use with the LIDAR core of FIG. 10A.
Figures 10C, 11:
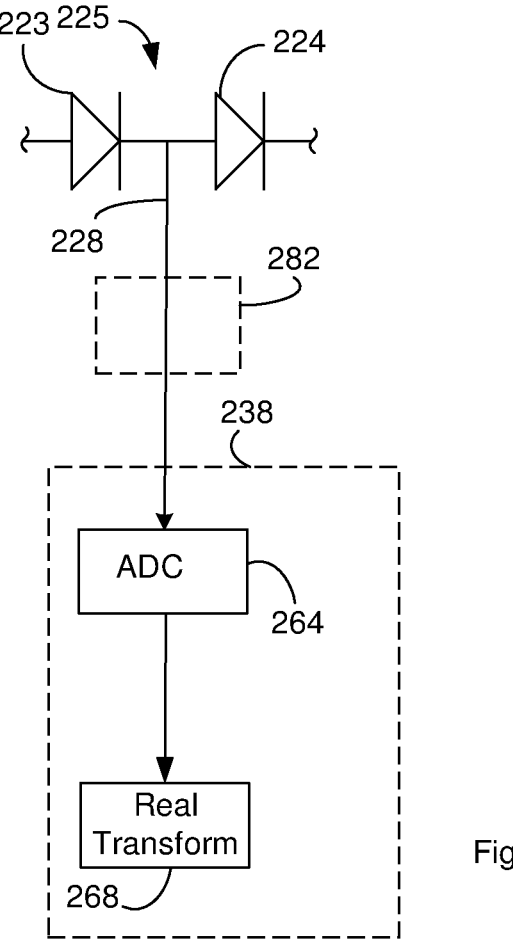
FIG. 10C provides a schematic of electronics that are suitable for use with a processing component constructed according to FIG. 10B.
FIG. 11 is a cross section of a portion of a silicon-on-insulator wafer that includes a waveguide.

The LIDAR core constructions disclosed above are examples and other LIDAR core constructions can be used. As an example, FIG. 10A through FIG. 10C illustrate and example of a LIDAR core suitable for use as a velocity core. FIG. 10A is a topview of the LIDAR core of FIG. 1A modified to include a frequency shifter 298 positioned along the utility waveguide 12. The electronics can operate the frequency shifter 298 so as to create a frequency offset between the LIDAR output signal and the reference signal. Since the system output signal includes or consists of light from the LIDAR output signal, there is also a frequency offset between the system output signal and the reference signal. Suitable frequency shifters include, but are not limited to, an acousto-optic frequency shifter.

The LIDAR core of FIG. 10A can provide an unambiguous solution for the beat frequency without the second data signal and accordingly without the imaginary component of complex signal. As a result, the processing component used in conjunction with the LIDAR core of FIG. 10A need not generate the second composite signal. Accordingly, the processing component used in conjunction with the LIDAR core of FIG. 10A can be used with the processing component of FIG. 5A modified to exclude the components needed to generate and process the second composite signal as shown in FIG. 10B. Similarly, the relationship between the electronics, the first light sensor 223 and the second light sensor 224 can be constructed as disclosed in the context of FIG. 5B but with the exclusion of the first auxiliary light sensor 218 and the second auxiliary light sensor 220 as illustrated in FIG. 10C.

The transform mechanism 238 includes a transform component 268 that receives the first digital data signal from the first Analog-to-Digital Converter (ADC) 264 as an input. The transform component 268 can be configured to perform a mathematical transform on the first digital data signal so as to convert from the time domain to the frequency domain. The mathematical transform can be a real transform such as a Fourier Transform. The electronics use the frequency peak output from the transform component 268 at $f_{ft}$ for further processing to generate the LIDAR data.

The system output signal from the LIDAR core of FIG. 10A can be a continuous wave (CW). For instance, the outgoing LIDAR signal, and accordingly the system output signal, can be an unchirped continuous wave (CW). As an example, the outgoing LIDAR signal, and accordingly the system output signal, can be represented by Equation 2: $G*\cos(H*t)$ where G and H are constants and t represents time. In some instances, G represents the square root of the power of the outgoing LIDAR signal. The electronics can approximate the radial velocity between the reflecting object and the LIDAR chip (v) using Equation 5: $v=c*f_{ft}/(2*(f_c+f_{os}))$ where $f_{ft}$ represents the peak frequency output from the transform component 268, c is the speed of light, $f_c$ represents the frequency of the LIDAR output signal and accordingly the system output signal, and $f_{os}$ represents the offset between the frequency of the system output signal and the reference signal. In many instances, $f_c >> f_{os}$ and the equation for radial velocity can be approximated as $v=c*f_{ft}/(2*f_c)$. As a result, multiple data periods and/or chirping are not needed to generate the radial velocity.

Example 1

A LIDAR system has a two-dimensional field of view. The field location $fl_1$ is located in RV sample region $SR_1$ and is identified as a known data point with coordinates $R_1=10$ m and an angular orientation of $\theta_1=10°$. The field location $fl_{10}$ is located in RV sample region $SR_{10}$ and is identified as a known data point with coordinates $R_{10}=16$ m and an angular orientation of $\theta_{10}=12°$. The field location $fl_{15}$ is selected as a subject field location and is located in V sample region $SR_{15}$ with an angular orientation of $\theta_{15}=11°$. The range $R_{15}$ for field location $fl_{15}$ is interpolated from the known data points $fl_1$ and $fl_{10}$ to be $R_{15}=13$ m using a linear interpolation where $R_{15}=R_1+(R_{10}-R_1)(\theta_{15}-\theta_1)/(\theta_{10}-\theta_1)$.

Suitable platforms for the LIDAR chips include, but are not limited to, silica, indium phosphide, and silicon-on-insulator wafers. FIG. 11 is a cross-section of portion of a chip constructed from a silicon-on-insulator wafer. A silicon-on-insulator (SOI) wafer includes a buried layer 330 between a substrate 332 and a light-transmitting medium 334. In a silicon-on-insulator wafer, the buried layer 330 is silica while the substrate 332 and the light-transmitting medium 334 are silicon. The substrate 332 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 332.

The dimensions of the ridge waveguide are labeled in FIG. 11. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 11 is suitable for all or a portion of the waveguides on LIDAR chips constructed according to FIG. 1A through FIG. 1C.

Suitable electronics 32 and/or common electronics 104 can include, but are not limited to, a controller that includes or consists of analog electrical circuits, Application Specific Integrated Circuits (ASICSs), digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Addressing the edge effect errors as disclosed above can be executed by the electronics 32. For instance, the process disclosed in the context of FIG. 7 and FIG. 6aB can be executed by the electronics 32. In particular, addressing the edge effect errors as disclosed above can be executed by a Field Programmable Gate Array (FPGA), software, hardware, firmware, or a combination thereof.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108, 472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demulitplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demulitplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of operating an imaging system, comprising: providing multiple cores that each illuminates multiple sample regions in a field of view for the system,
   a first portion of the cores including a range and velocity core and a second portion of the cores including a velocity core,
   the sample regions having sample regions in a first portion of the sample regions and sample regions in a second portion of the sample regions, the sample regions in the first portion of the sample regions each being illuminated by a system output signal output from the range and velocity core,
   the sample regions in the second portion of the sample regions each being illuminated by a system output signal output from the velocity core; and
   identifying one of the sample regions in the first portion of the sample regions to serve as a potential sample region and one of the sample regions in the second portion of the sample regions serving as a subject sample region;
calculating a radial velocity for the subject sample region; and calculating a radial velocity for the potential sample region;
   the radial velocity for the subject sample region indicating the radial velocity between the system and an object located in the subject sample region, and
   the radial velocity for the subject sample region being calculated from a beat frequency of a composite signal generated by the velocity core,
   the radial velocity for the potential sample region being calculated from a beat frequency of a composite signal generated by the range and velocity core,
calculating a range for the potential sample region,
   the range for the potential sample region indicating a distance between the system and an object located in the potential sample region,
   the range for the potential sample region being calculated from a beat frequency of the composite signal generated by the range and velocity core;
comparing the radial velocity for the potential sample region in combination with the radial velocity for the subject sample region to one or more velocity criteria that identify whether a same object is positioned in the subject sample region and the potential sample region, and
generating an estimate of a range for the subject sample region in response to the one or more velocity criteria indicating that the same object is positioned in the subject sample region and the potential sample region, the range for the potential sample region is used in generating the estimate of the range for the subject sample region in response to the one or more velocity criteria indicating that the same object is positioned in the subject sample region and the potential sample region, and the range for the potential sample region is not used in generating the estimate of the range for the subject sample region in response to the one or more velocity criteria indicating that the same object is not positioned in the subject sample region and the potential sample region.

2. The method of claim 1, wherein generating the estimate of the range for the subject sample region includes an interpolation between range values that each indicates a distance between the LIDAR system and an object in one of the sample regions in the first portion of the sample regions.

3. The method of claim 2, wherein the range values are used as known data points in the interpolation.

4. The method of claim 2, wherein generating the estimate of the range for the subject sample region includes an extrapolation from range values that each indicates a distance between the LIDAR system and an object in one of the sample regions in the first portion of the sample regions.

5. The method of claim 2, wherein the range for the subject sample region is not directly calculated from the beat frequency of the composite signal generated by the velocity core.

6. The method of claim 2, wherein comparing the radial velocity for the potential sample region in combination with the radial velocity calculated for the subject sample region to the one or more velocity criteria includes comparing a difference between the radial velocity for the subject sample and the radial velocity for the potential sample region to a velocity threshold.

7. An imaging system, comprising:

multiple cores that each illuminates multiple sample regions in a field of view for the system, each of the cores configured to generate a composite signal beating at a beat frequency, and the cores including a range and velocity core and a velocity core, the sample regions having sample regions in a first portion of the sample regions and sample regions in a second portion of the sample regions, the sample regions in the first portion of the sample regions each being illuminated by a system output signal output from the range and velocity core, the sample regions in the second portion of the sample regions each being illuminated by a system output signal output from the velocity core; and electronics configured to identify one of the sample regions in the first portion of the sample regions to serve as a potential sample region and to identify one of the sample regions in the second portion of the sample regions serving as a subject sample region, the electronics configured to calculate a radial velocity for the subject sample region, the electronics also configured to calculate a range for the potential sample region, and the electronics also configured to calculate a radial velocity for the potential sample region, the range for the potential sample region indicating a distance between the system and an object located in the potential sample region, the electronics calculating the range for the potential sample region from the beat frequency of the composite signal generated by the range and velocity core, the radial velocity for subject sample region indicating a level of radial velocity between the system and an object located in the subject sample region, the electronics calculating the radial velocity for the subject sample region from the beat frequency of the composite signal generated by the velocity core velocity core, the electronics calculating the radial velocity for the potential sample region from the beat frequency of the composite signal generated by the range and velocity core, the electronics configured to compare the radial velocity for the potential sample region in combination with the radial velocity for the subject sample region to one or more velocity criteria that identify whether a same object is positioned in the subject sample region and the potential sample region, and the electronics configured to generate an estimate of a range for the subject sample region in response to the one or more velocity criteria indicating that the same object is positioned in the subject sample region and the potential sample region, the range for the potential sample region is used in generating the estimate of the range for the subject sample region in response to the one or more velocity criteria indicating that the same object is positioned in the subject sample region and the potential sample region, and the range for the potential sample region is not used in generating the estimate of the range for the subject sample region in response to the one or more velocity criteria indicating that the same object is not positioned in the subject sample region and the potential sample region.

8. The system of claim 7, wherein generating the estimate of the range for the subject sample region includes an interpolation between range values that each indicates a distance between the LIDAR system and an object in one of the sample regions in the first portion of the sample regions.

9. The system of claim 8, wherein the range values are used as known data points in the interpolation.

10. The system of claim 7, wherein generating the estimate of the range for the subject sample region includes an extrapolation from range values that each indicates a distance between the LIDAR system and an object in one of the sample regions in the first portion of the sample regions.

11. The system of claim 7, wherein the range for the subject sample region is not calculated directly from the beat frequency of the composite signal generated by the velocity core.

12. The system of claim 7, wherein comparing the radial velocity for the potential sample region in combination with the radial velocity for the subject sample region to the one or more velocity criteria includes comparing a difference between the radial velocity for the subject sample region and the radial velocity for the potential sample region to a velocity threshold.

* * * * *